United States Patent
Conway et al.

(10) Patent No.: US 7,006,725 B2
(45) Date of Patent: Feb. 28, 2006

(54) HIGH EXTINCTION RATIO FIBER INTERFEROMETER

(75) Inventors: Joshua A. Conway, Hermosa Beach, CA (US); William S. Hoult, Jr., Redondo Beach, CA (US)

(73) Assignee: The Boeing Company, Chicago, IL (US)

( * ) Notice: Subject to any disclaimer, the term of this patent is extended or adjusted under 35 U.S.C. 154(b) by 82 days.

(21) Appl. No.: 10/659,882

(22) Filed: Sep. 11, 2003

(65) Prior Publication Data

US 2005/0058394 A1 Mar. 17, 2005

(51) Int. Cl.
*G02B 6/24* (2006.01)
*H04B 10/12* (2006.01)

(52) U.S. Cl. ............... 385/27; 385/31; 359/337.22; 356/477

(58) Field of Classification Search ........... 385/31, 385/27; 356/477–483; 359/337.22
See application file for complete search history.

(56) References Cited

U.S. PATENT DOCUMENTS 6,324,322 B1 * 11/2001 Luo et al. ................. 385/43

* cited by examiner

*Primary Examiner*—Akm Enayet Ullah
*Assistant Examiner*—Jerry T. Rahll
(74) *Attorney, Agent, or Firm*—Gates & Cooper LLP

(57) ABSTRACT

A high extinction ratio interferometer is disclosed. The interferometer includes a first and second optical fiber each having a first end and a reflective end and an optical coupler for coupling the first optical fiber and the second optical fiber between their first ends and their reflective ends. The first optical fiber provides a first optical path from the optical coupler to its reflective end and back to the optical coupler and the second optical fiber provides a second optical path from the optical coupler to its reflective end and back to the optical coupler. The second path is greater than the first path by a delay length and the first path and the second path are each less than approximately 20 cm. The interferometer finds application as a differential phase shift keyed (DPSK) demodulator, particularly useful in a satellite system employing inter-satellite communication.

16 Claims, 3 Drawing Sheets

HIGH EXTINCTION RATIO FIBER INTERFEROMETER

BACKGROUND OF THE INVENTION

1. Field of the Invention

The present invention relates to apparatuses and methods for implementing optical differential phase shift keying (DPSK) demodulation in a communication system, and particularly for implementing optical DPSK demodulation in a satellite communication system.

2. Description of the Related Art

Optical DPSK modulation schemes generally allow a 3 dB signal gain over conventional on-off keyed systems, which make them ideal for satellite communications. Optical DPSK receivers require a demodulator, typically a Mach-Zhender interferometer as is known in the art, to convert the bit stream from phase-shift keyed to on-off Keyed.

The efficiency of an optical DPSK communication link can be characterized by its bit-error-rate (BER). The BER is greatly affected by the quality of the demodulator. In fact, in many applications a very pure optical interference is required to achieve acceptable BER. This purity can be measured by the extinction ratio (ER). Typically in the art, a fiber Mach-Zhender interferometer is used as a DPSK demodulator because it has low loss and is fairly robust. On the other hand, the optical state of polarization (SOP) is randomly changed within the fiber by macro and micro bends, random stresses, inherent imperfections, and thermal and accoustic perturbations. Because these SOPs are randomly scrambled, optical interference is degraded which dramatically degrades the ER.

In view of the foregoing discussion, there is a need in the art for an interferometer which is robust, precise and easily manufactured. In addition, there is particularly a need for such an interferometer in an optical differential phase shift keying (DPSK) demodulator in a communication system, such as a satellite communication system. As detailed hereafter, the present invention meets these needs.

SUMMARY OF THE INVENTION

Embodiments of the present invention generally comprise a highly sensitive variation of a Michelson interferometer, ideal for optical DPSK communications systems. Further, embodiments of the invention remedy the problem of scrambled SOPs without sacrificing the robust nature of the fiber interferometer. In addition, as manufacturability is a key issue in precision interferometer development, it is important that embodiments of the present invention are easily fabricated by unskilled labor, and even lends itself to assembly line production.

A typical interferometer embodiment of the invention includes a first optical fiber having a first end for receiving a signal input and providing a first output and a first reflective end opposite the first end, a second optical fiber having a second output end and a second reflective end and an optical coupler for coupling the first optical fiber and the second optical fiber between the first end and first reflective end of the first optical fiber and the second output end and second reflective end of the second optical fiber. The first optical fiber provides a first optical path from the optical coupler to the first reflective end and back to the optical coupler and the second optical fiber provides a second optical path from the optical coupler to the second reflective end and back to the optical coupler. The second path is greater than the first path by a delay length and the first path and the second path are each less than approximately 20 cm.

Similarly, a typical method of producing an interferometer of the present invention includes providing a first optical fiber having a first end for receiving a signal input and a first output and a second optical fiber having a second output end. The first optical fiber and the second optical fiber are coupled between the first end and first reflective end of the first optical fiber and the second output end and second reflective end of the second optical fiber with an optical coupler. The first optical fiber and is cleaved and a first reflective end is formed opposite the first end such that the first optical fiber provides a first optical path from the optical coupler to the first reflective end and back to the optical coupler. The second optical fiber is cleaved and a second reflective end is formed opposite the second output end such that the second optical fiber provides a second optical path from the optical coupler to the second reflective end and back to the optical coupler and such that the second path is greater than the first path by a delay length and the first path and the second path are each less than approximately 20 cm.

Short path lengths are an important feature of the present invention. Accordingly, the first and second paths can each be less than a length limit selected from the group consisting of 18 cm, 16 cm, 14 cm, 12 cm and 10 cm.

The present invention represents a very significant advance in the laser communications technology area, as it provides a simple, elegant solution to DPSK demodulation. Furthermore, because embodiments of the invention do not require additional optical elements or control loops while still increasing the extinction ratio, the probability of error is greatly reduced. A 50:50 coupler can be used to implement the DPSK demodulator embodiment where the delay length corresponds to approximately one bit of the modulated signal.

Further, embodiments of the invention are much lighter than the current art, utilizing a Mach-Zhender interferometer; estimates indicate a weight decrease of as much as 75%. The present invention also offers a similar reduction in size.

Embodiments of the present invention are also simple to fabricate. Thus, it can be produced by technicians having only basic skills. In contrast, with the Mach-Zhender approach, only a very limited number of technicians possess the skill necessary to fabricate an acceptable interferometer. The reflective ends can be cleaved and coated with silver, however, gold coating should produce better results.

In addition, inter-satellite optical communication represents a great leap forward in the exploding field of telecommunications and DPSK offers a very efficient single-wavelength coding method. Hence, DPSK is very attractive for those pursuing laser communication in an inter-satellite system. The present invention provides a simple, compact and efficient DPSK demodulation apparatus and method for use in such applications.

BRIEF DESCRIPTION OF THE DRAWINGS

Referring now to the drawings in which like reference numbers represent corresponding parts throughout.

DETAILED DESCRIPTION OF THE PREFERRED EMBODIMENT

Figure 1:
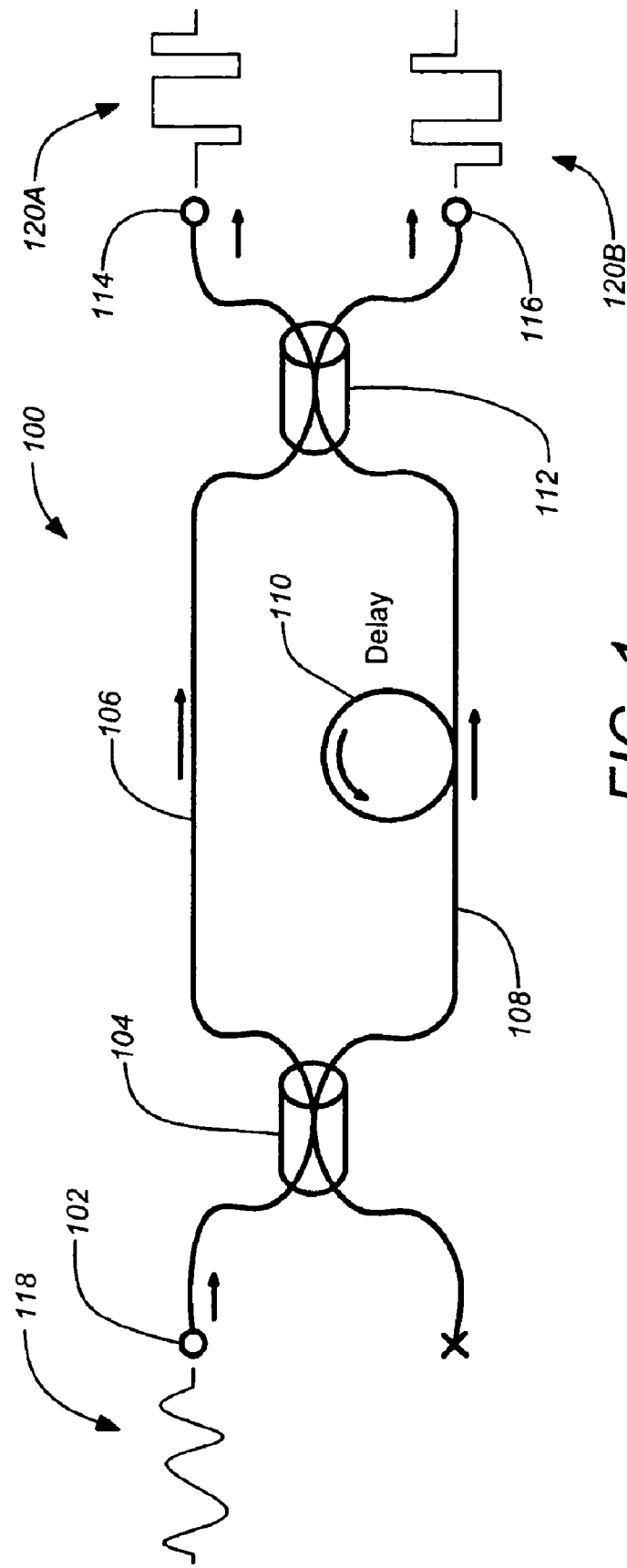
FIG. 1 illustrates the construction of a conventional Mach-Zhender interferometer.

In the following description of the preferred embodiment, reference is made to the accompanying drawings which form a part hereof, and in which is shown by way of illustration specific embodiments in which the invention may be practiced. It is to be understood that other embodiments may be utilized and structural changes may be made without departing from the scope of the present invention.

1. Overview

Embodiments of the present invention generally encompass a Michelson fiber interferometer which can be used in an optical DPSK demodulator. The purity of the interference is guaranteed by cleaving the optical fibers of the interferometer such that the path lengths are less than approximately 10 cm. This defeats the random variations in SOP otherwise present between the optical fibers.

The description of this invention rests on the principles of optical DPSK communications. The essential idea of optical DPSK is that bits are encoded onto an optical carrier (with a coherence time much greater than the length of one bit) by modulating the phase by 0 or π. This creates an antipodal signaling in which each bit is encoded by its relation to the preceding bit. See R. M. Gagliardi, Introduction to Communications Engineering (John Wiley and Sons, New York, 1988) which is incorporated by reference herein. This scheme provides a 3 dB increased operation compared to conventional on-off-keyed systems, and therefore is ideally suited for low power links, such as used in many satellite communication applications. Previously, a Mach-Zhender is optimally selected for such applications.

2. Mitigating Random State of Polarization in an Interferometer

As discussed above, there is need to mitigate the random state of polarization (SOP) occurring in interferometers. Some approaches that can be used to achieve One approach to mitigate the above problem is to employ a polarization maintaining (PM) fiber in the interferometer. If the optical signal is launched into a PM fiber with linear polarization along one of the fibers axes, the SOP is maintained very efficiently along long lengths of fiber and the interferometer is well behaved and efficient. For satellite communications, however, the light will enter the interferometer at a random SOP, and then be randomly changed by the PM fiber, leading to even greater distortion than single mode fiber. A polarization controller can be used to overcome this. However, implementing a polarization controller requires a control loop which introduces a great deal of added complexity as well as the possibility of a catastrophic failure. Consequently, PM fiber is unacceptable, particularly for satellite applications where high reliability is critical.

A second approach involves using a fiber Michelson interferometer with a 45 degree faraday rotator mirror (FRM) on each optical path. This elegant approach causes a backwards retracing of the polarization shift, compensating for the local stresses and imperfections in the optical paths (also referred to as "arms") of the interferometer. This allows the interfering beams to have identical polarization and hence high sensitivity. This architecture is simple to fabricate and very sensitive. However, the FRMs are temperature sensitive and typically require thermoelectric cooling (TEC) and the added complexity of a temperature control loop. A second drawback to this design is that it introduces approximately 3 dB of insertion loss due to the FRMs, coupler and circulators.

A third approach involves bending and twisting the fiber of the interferometer to induce stresses which counteract the inherent birefringence. The interferometer is then immediately "potted" in RTV. This approach can be successful in producing demodulators that achieve approximately 25 dB ER, but the process is extremely labor intensive. Furthermore, this approach yield highly variable results and requires a very high skill level to fabricate. The weight and size of this design also presents a problem for communication satellite applications; because a relatively long length is needed for splicing and for the appropriate twisting, a large, vibration damping package is necessary. However, as is well known in the art, size and weight capacity are very limited in satellite design, and minimizing these parameters is critical to success.

3. Interferometer Principle in a Mach-Zhender Interferometer

FIG. 1 illustrates the construction of a conventional Mach-Zhender interferometer 100. As is known in the art, a DPSK signal can be demodulated using a delay-and-correlate scheme in which each bit is split and compared with the preceding bit. The use of a fiber interferometer as a DPSK demodulator is ideally suited to this task and well known in the art. In the conventional embodiment shown, a modulated optical data signal 118 enters a first input 102 of a first optical fiber and is split in a first 50:50 coupler 104. The signal then traverses two separate paths (i.e., along separate optical fibers), a first path 106 and a second path 108 which has an optical path length equal to the first path 106 plus a delay length 110 corresponding to one bit of the modulated signal. The light from the first and second paths 106, 108 then traverses a second coupler 112 that outputs to a first output 114 from the first path 106 and a second output 116 from the second path 108. Note that the length of interest for each path 106, 108 starts at the first coupler 104 and ends at the second coupler 112. Depending upon whether the two adjacent bits were in phase or π radians out of phase when they arrive at the second coupler 112, all of the signal light is directed into either the first output 114 or the second output 116 due to the interference of the combining bits. Thus, the optical data signal 118 is demodulated into intensity-modulated signals 120A, 120B at the respective first and second outputs 114, 116.

The above interference is ideal only if the interfering wave fronts have identical polarization. Any deviation from this condition results in degradation of the extinction ratio (ER), a measure of the purity of the interference. As is well known in the art, a single-mode optical fiber actually supports two degenerate modes, propagating perpendicular to each other. This degeneracy is broken by local and randomly varying birefringence along the length of the fiber, due to imperfectly circular cores, random stresses, and bending. See e.g., C. R. Menyuk and P. K. A. Wai, J. Opt. Soc. Am. B, 11, 1288 (1994), which is incorporated by reference herein. This causes the polarization angle and phase to do a random walk as the light propagates down the length of the fiber, and has serious repercussions for the development of an efficient fiber interferometer.

In the current art, the Mach-Zhender (M-Z) interferometer scheme is used. With a Mach-Zhender interferometer, the random birefringence is typically compensated for by counter-bending and twisting the fibers before splicing the two couplers together. This method has been successful in creating interferometers that just meet requirements for communication satellite applications, but only after a very labor intensive and tedious process. It must also be stressed that this process requires a very high degree of skill. On the other hand, it is known that the polarization undergoes a change that can be qualitatively described by the hyperbolic tangent of a scale factor times the length of the fiber. See I. P. Kaminow, IEEE J. Quan. Elec. QE-17, 15 (1981), which is incorporated by reference herein.

4. Exemplary Interferometer Embodiment of the Invention

In the present invention, from various data and interpretation it is recognized that the polarization change can be made negligible if the path lengths are made short, e.g. less than approximately 20 cm. Unfortunately, it would be technically very difficult to manufacture an M-Z interferometer with such short path lengths because of the demands of the fabrication process. However, it is feasible to construct a Michelson interferometer with such short path lengths. By making the path lengths as short as possible, the polarization shifts can be made negligible and the purity of the demodulation dramatically increased.

Figure 2:
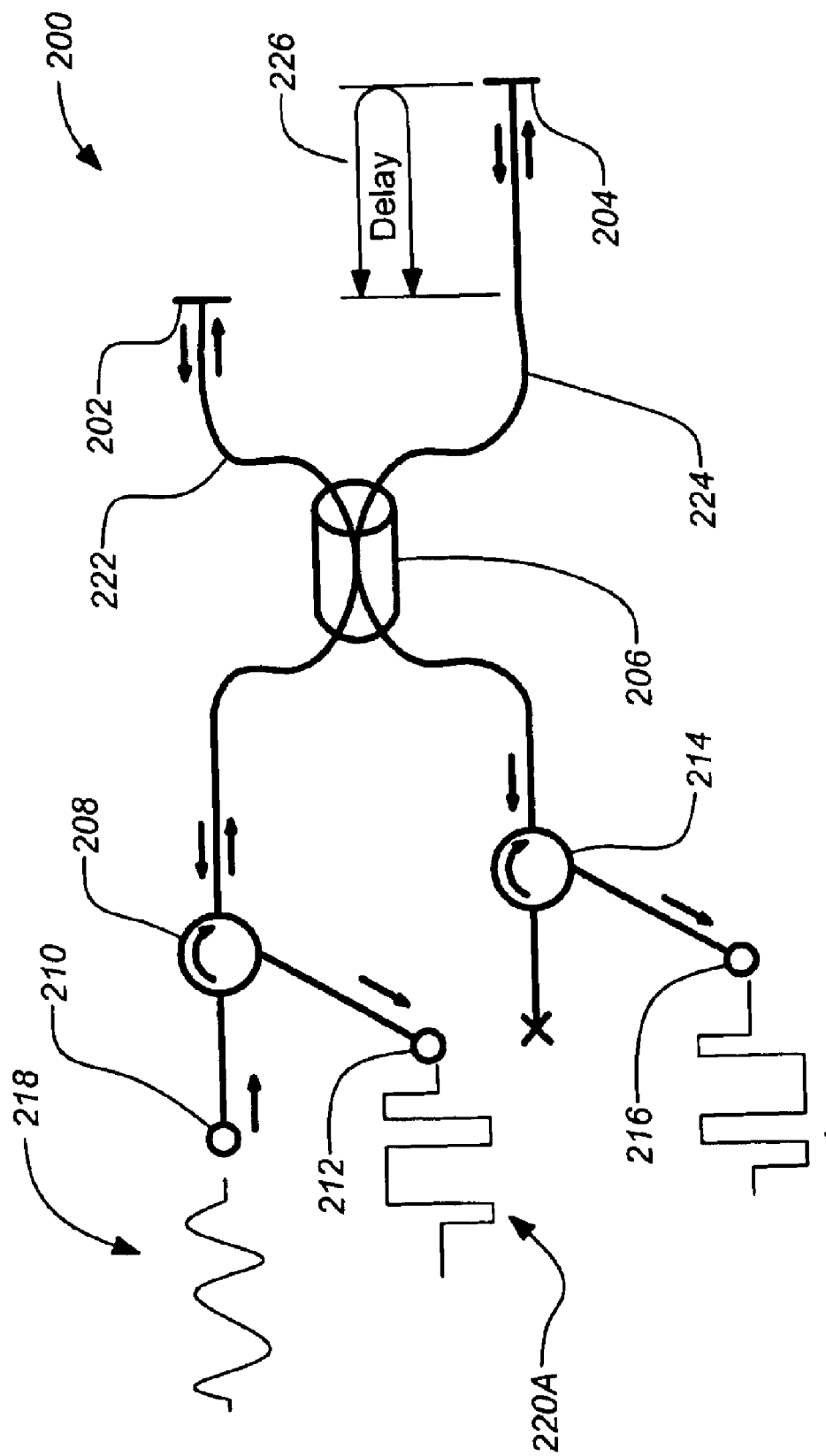
FIG. 2 illustrates an exemplary interferometer embodiment of the present invention.

FIG. 2 illustrates an exemplary interferometer 200 of the present invention. The interferometer 200 operates on a principle similar to the M-Z interferometer 100 previously described. However with this interferometer 200, light is reflected at the a first and a second reflective ends 202, 204 (also referred to as a reflective facet), then retraces a path back through a single coupler 206 (e.g., a 50:50 coupler). The first and second paths 222, 224 begin at the coupler 206, run to their respective reflective ends 202, 204 and then return to the coupler 206. Thus, for a Michelson interferometer 200, a path length is twice the length of the optical fiber from the coupler 206 to each reflective end 202, 204. The second path includes an additional delay length 226 which produces an effective delay equal to twice the length difference between the optical fibers of the first and second paths 222, 224 due to the reflective operation of the interferometer 200. For a DPSK demodulation, the delay corresponds to one bit of the modulated signal as described previously. Consequently, to produce a path length less than approximately 20 cm, as mentioned above, requires an optical fiber length from the coupler 206 to the reflective end 202 or 204 of less than approximate 10 cm.

As the two signals 218, 220A run in the same optical fiber, a first circulator 208 is employed at the first input 210 to separate the modulated input signal 218 (i.e., the phase-modulated signal) from the demodulated output signal 220A (i.e., the intensity-modulated signal) at the first output 212. In addition, a second circulator 214 can be introduced at the second output 216 to conveniently produce in the second output signal 220B a substantially similar effect as the first circulator 208 has on the first output signal 220A. Thus, the second circulator 214 has a compensating effect on the overall output of the two output signals 220A, 220B.

5. Exemplary Method of Producing an Interferometer of the Invention

A fabrication advantage to embodiments of the present invention arises because no splicing is required. The optical fibers require only cleaving and the deposition of a reflective surface onto the facets. It is possible to quickly obtain clean cleaved ends with fiber lengths as short as 1 cm (i.e., paths of 2 cm), much less than the 10 cm fiber lengths mentioned earlier. As previously discussed, the factor of two is introduced because the light passes through the same optical path twice. Because the device is more than 75% smaller than the packaged Mach-Zhender scheme, the present invention inherently reduces weight and size. In addition, because this device can be made with fiber lengths 90% shorter than those of the M-Z configuration and perturbations generally cause problems by increasing the scale factor mentioned earlier, embodiments of the present invention are also more robust to external perturbations.

Figure 3:
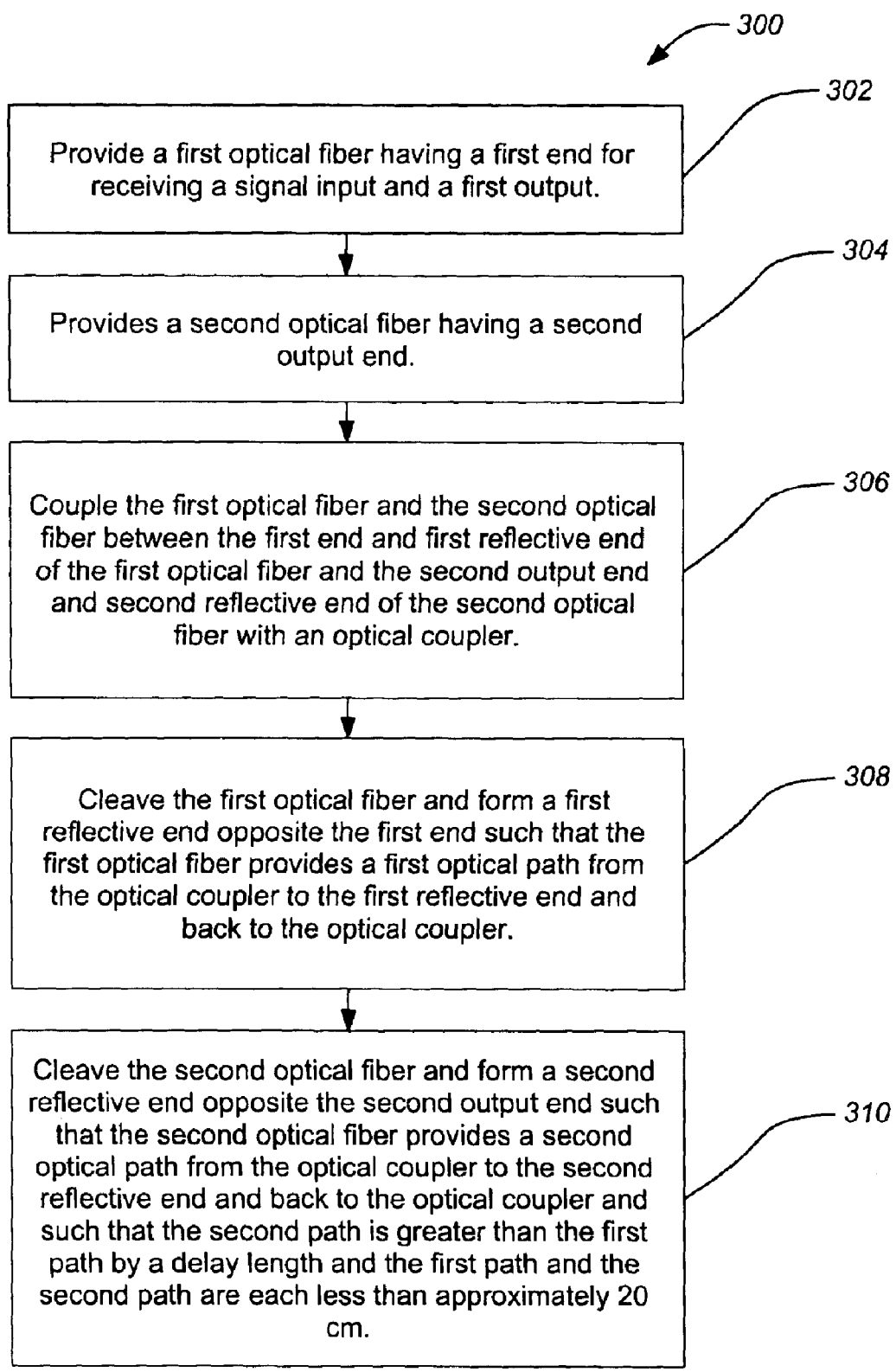
FIG. 3 is a flowchart of an exemplary method of producing an interferometer of the present invention.

FIG. 3 is a flowchart of an exemplary method 300 of producing an interferometer of the present invention. In a first step 302, a first optical fiber having a first end for receiving a signal input and a first output is provided. A second optical fiber having a second output end is provided in step 304. The first optical fiber and the second optical fiber are coupled between the first end and first reflective end of the first optical fiber and the second output end and second reflective end of the second optical fiber with an optical coupler in step 306. In step 308, the first optical fiber and is cleaved and a first reflective end is formed opposite the first end such that the first optical fiber provides a first optical path from the optical coupler to the first reflective end and back to the optical coupler. In step 310, the second optical fiber is cleaved and a second reflective end is formed opposite the second output end such that the second optical fiber provides a second optical path from the optical coupler to the second reflective end and back to the optical coupler and such that the second path is greater than the first path by a delay length and the first path and the second path are each less than approximately 20 cm.

To produce an interferometer of the present invention, the fiber ends are cleaved and their facets coated with silver as a metallic reflector. It can be demonstrated using this process, that the fibers are very robust in response to sheering stresses, bending stresses, and twisting, as well as general handling of the coated tips. However, the reflectivity can degrade, most likely due to oxidation of the silver during processing. Consequently, as gold coatings do not oxidize, such coatings are recommended. Even so, embodiments of the invention should exhibit a very high tolerance to reflectivity (approximately >5%).

This concludes the description including the preferred embodiments of the present invention. The foregoing description of the preferred embodiment of the invention has been presented for the purposes of illustration and description. It is not intended to be exhaustive or to limit the invention to the precise form disclosed. Many modifications and variations are possible in light of the above teaching.

It is intended that the scope of the invention be limited not by this detailed description, but rather by the claims appended hereto. The above specification, examples and data provide a complete description of the manufacture and use of the apparatus and method of the invention. Since many embodiments of the invention can be made without departing from the scope of the invention, the invention resides in the claims hereinafter appended.

What is claimed is:

1. An optical interferometer, comprising:
   a first optical fiber having a first end for receiving a signal input and providing a first output and a first reflective end opposite the first end;
   a second optical fiber having a second output end and a second reflective end; and
   an optical coupler for coupling the first optical fiber and the second optical fiber between the first end and first reflective end of the first optical fiber and the second output end and second reflective end of the second optical fiber;
   wherein the first optical fiber provides a first optical path from the optical coupler to the first reflective end and back to the optical coupler and the second optical fiber provides a second optical path from the optical coupler to the second reflective end and back to the optical coupler; and
   wherein the second path is greater than the first path by a delay length and the first path and and the second path are each less than approximately 20 cm, and the delay length corresponds to approximately one bit of the modulated signal.

2. The apparatus of claim 1, wherein the received signal input comprises a differential phase shift keyed (DPSK) signal and the optical interferometer operates to demodulate the DPSK signal.

3. The apparatus of claim 1, wherein the first path and the second path are each less than a length limit selected from the group consisting of 18 cm, 16 cm, 14 cm, 12 cm and 10 cm.

4. The apparatus of claim 1, wherein the optical interferometer is employed in a satellite communication system.

5. The apparatus of claim 4, wherein the signal input is an inter-satellite signal in the satellite communication system.

6. The apparatus of claim 1, wherein at least one of the first and second reflective ends is cleaved and coated with silver.

7. The apparatus of claim 1, wherein at least one of the first and second reflective ends is cleaved and coated with gold.

8. The apparatus of claim 1, wherein the coupler comprises a 50:50 coupler.

9. A method of producing an optical interferometer, comprising:

providing a first optical fiber having a first end for receiving a signal input and a first output;

providing a second optical fiber having a second output end;

cleaving the first optical fiber and forming a first reflective end opposite the first end;

cleaving the second optical fiber and forming a second reflective end opposite the second output end;

coupling the first optical fiber and the second optical fiber between the first end and first reflective end of the first optical fiber and the second output end and second reflective end of the second optical fiber with an optical coupler;

wherein the first optical fiber provides a first optical path from the optical coupler to the first reflective end and back to the optical coupler;

wherein the second optical fiber provides a second optical path from the optical coupler to the second reflective end and back to the optical coupler; and wherein the second path is greater than the first path by a delay length and the first path and the second path are each less than approximately 20 cm, and the delay length corresponds to approximately one bit of the modulated signal.

10. The method of claim 7, wherein the coupler comprises a 50:50 coupler.

11. The method of claim 9, wherein the received signal input comprises a differential phase shift keyed (DPSK) signal and the optical interferometer operates to demodulate the DPSK signal.

12. The method of claim 9, wherein the first path and the second path are each less than a length limit selected from the group consisting of 18 cm, 16 cm, 14 cm, 12 cm and 10 cm.

13. The method of claim 9, wherein the optical interferometer is employed in a satellite communication system.

14. The method of claim 13, wherein the signal input is an inter-satellite signal in the satellite communication system.

15. The method of claim 9, wherein at least one of the first and second reflective ends is cleaved and coated with silver.

16. The method of claim 9, wherein at least one of the first and second reflective ends is cleaved and coated with gold.

* * * * *